Oct. 30, 1923.
J. B. STROUD
DEMOUNTABLE RIM TOOL
Filed Nov. 20, 1922
1,472,777
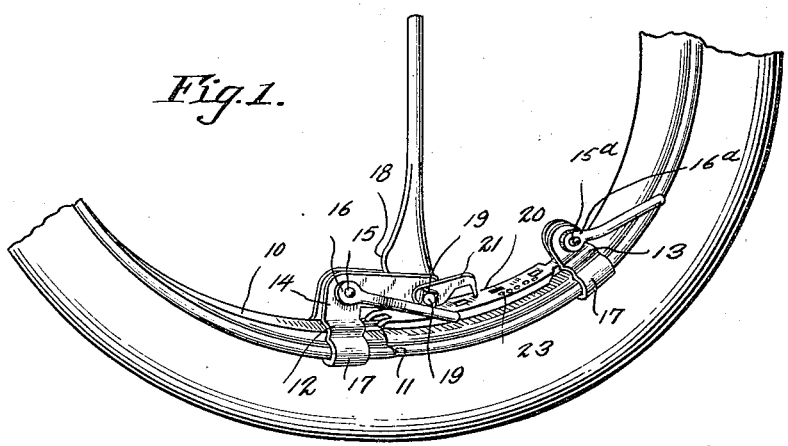
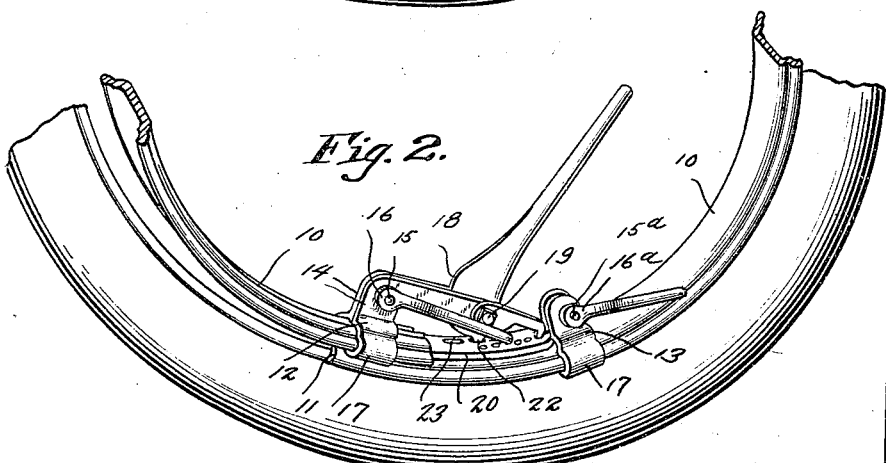
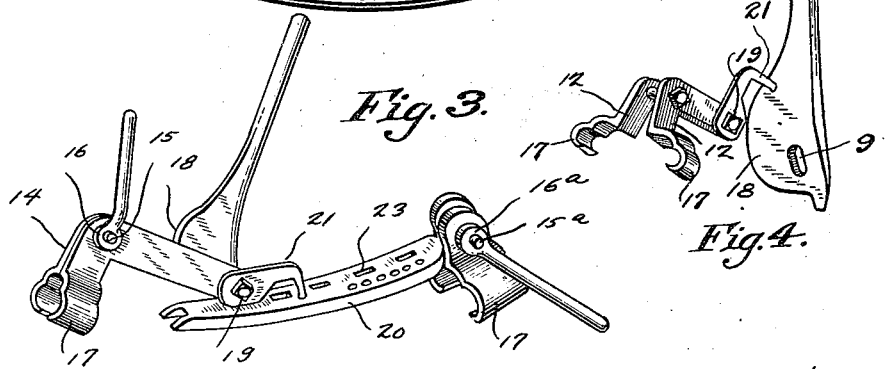
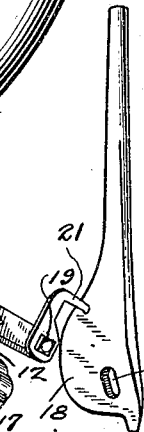
Inventor.
John Bell Stroud Patented Oct. 30, 1923.

1,472,777

UNITED STATES PATENT OFFICE.

JOHN BELL STROUD, OF PASS CHRISTIAN, MISSISSIPPI.

DEMOUNTABLE-RIM TOOL.

Application filed November 20, 1922. Serial No. 602,167.

*To all whom it may concern:*

Be it known that I, JOHN B. STROUD, a citizen of the United States, and a resident of Pass Christian, in the county of Harrison and State of Mississippi, have invented a certain new and useful Improvement in Demountable-Rim Tools, of which the following is a specification.

My invention relates to improvements in breaking the joint of split rims previous to removing the tires therefrom and holding the same in a contracted position while the tire is removed and replaced.

In removing a tire from its rim it is very difficult to part the ends of rim so that one end of rim will rise above the other to be contracted and still more difficult to force the ends back into lock after tire has been replaced thereon.

The object of my invention is to provide means for overcoming this difficulty which is simple and inexpensive in construction. With this and other objects in view my invention consists of a perforated plate attachable to and detachable from a split rim, said perforations being engageable with a cam tooth and being adapted for the purpose of breaking the joint of a split rim and of overlapping one end of rim above the other and of forcing ends of said rim back into joint. Said cam is provided with a slot vertically channeled, the purpose of said slot being to lower or raise said cam tooth according to the elevation of end of rim lifted up and retain its engagement with the perforations of the plate.

My invention consists further in certain features of construction, arrangement, and combination of parts which will be hereinafter described and pointed out in the claim reference being had to the accompanying drawings in which—

Fig. 1 is a side elevation of my invention as applied.

Fig. 2 is a similar view showing ends of rim overlapped and held by a pawl.

Fig. 3 is a comprehensive view of the invention assembled off the rim.

Fig. 4 is another view of certain members which obviously would constitute an operable tool independent of other members if used on a split rim having perforations laterally extending from end of rim not lifted up.

Referring more particularly to the drawings, 10 represents a portion of a split rim of the straight side type, the joint being represented by 11 on Fig. 1. My device as shown comprises two clamping members, 12 and 13, each consisting of side plates held together by bolt 15 and lever nut 16, and bolt 15$^a$ and lever 16$^a$. The lower ends of said plates being spread apart and bent at various angles to fit a straight side rim of the ordinary type and forming gripping flanges.

Extending laterally from jaws of clamp 12 (the clamps which in practice are placed near joint 11 of the rim) are two right angular arms apertured at their respective ends to receive bolt 19, Fig. 1, said arms project over said joint 11 sufficient for the free movement of cam 18, (which pivots on bolt 19 between ends of said arms) without contact with end of rim 10 in the operation of contracting and expanding said rim. Said cam is provided with a slot vertical with cam lever, Fig. 4. Said cam carries on its lower face a projecting tooth 22, adapted to engage perforation of plate 20, Figs. 1, 2 and 3. Slot in cam 18 adapts said cam tooth to retain its engagement with perforated plate 20 when end of rim is lifted up for contraction and expansion, projecting arms being rigid, or integral with clamp 12 between which cam 18 pivots.

Perforated plate 20 is curved to fit the face of rim 10 and has one of its ends positioned under cam 18 with cam tooth in engagement with perforation of said plate. At the other end of said plate, the sides are cut away forming a flat neck. The cutting away of said sides is for a two-fold purpose. First, it affords a flat neck projecting upward from face of rim 10, said neck positions between jaws of said clamp 13. Said neck has an eye to receive bolt 15$^a$ which passes through apertured jaws of clamp 13, Figs. 1, 2 and 3. Second, is to provide right angular shoulders to rest against the sides of said jaws of clamp 13, thus obviating a movement of said plate out of alignment with cam tooth in the operation of contracting and expanding a demountable rim. Through the action of lever nut 16$^a$, said plate 20 is held rigid to the face of rim 10. The device is now in a rigid condition except cam 18 which pivots slidably on bolt 19, Figs. 1, 2 and 3. To operate the device, cam lever is moved to the left by foot or hand (the cam tooth being in perforation of plate 20, Fig. 1) causing the end of rim to move apart, and as lever cam is moved further cam face being in engagement with end of plate 20, raises one end of rim above the other and through the action of cam the ends of rim are overlapped. The cam being slotted and slidably disposed on bolt 19, adapts cam tooth to engage with perforations of plate whereby the movement of lever cam ratchet-wise in the opposite direction causes an overlapping of the ends of rim where they are retained in overlapped condition by pawl 21 for the removal of a tire from a rim and the replacement of a tire thereon, Fig. 2. Release pawl 21 and move lever cam ratchet-wise in the opposite direction and the ends of rim are forced back into lock, Fig. 1.

It will thus be seen that I provide a simple, inexpensive and efficient tool for the removing of tires from demountable rims and replacing same thereon.

I claim:

In a rim tool of the class specified the combination with a clamp to grip one end of a split rim and having rigid substantially right angular arms projecting normally over the other end of the split rim, and a second clamp to grip said other end of the split rim and having a perforated plate pivoted thereto, of a lever pivoted to the projecting arms and having a cam surface for raising one end of the rim radially, and a tooth engageable with the perforations of the plate for shifting the ends of the rim circumferentially for the purpose specified.

JOHN BELL STROUD.

Witnesses:
  REBELLIA H. BRANDT STROUD,
  ANNA M. BRANDT.